3,121,113
Patented Feb. 11, 1964

3,121,113
1-BENZYLOXY-3-ACYL-UREAS
Jack Bernstein and Kathryn A. Losee, New Brunswick, and Morris A. Dolliver, Edison, N.J., assignors to Olin Mathieson Chemical Corporation, New York, N.Y., a corporation of Virginia
No Drawing. Filed Aug. 20, 1962, Ser. No. 218,154
5 Claims. (Cl. 260—553)

This invention relates to an improved process for preparing compounds of the general formula $$R-\underset{\underset{R''}{|}}{\overset{\overset{R'}{|}}{C}}-CO-\underset{}{\overset{H}{N}}-\underset{\overset{\|}{O}}{C}-\overset{Z}{N}-OY$$

wherein R is hydrogen, lower alkyl, lower alkenyl, monocyclic aryl, or monocyclic ar(lower alkyl); R' and R'' are each hydrogen, lower alkyl or monocyclic aryl; R' and R'' together with the carbon to which they are joined is lower cycloalkyl (i.e. a cycloalkyl radical of less than eight carbon atoms); R, R' and R'' together with the carbon to which they are joined is phenyl or pyridyl; Y is hydrogen, lower alkyl or benzyl; and Z is hydrogen or lower alkyl; and to certain new intermediates employed in said process, namely, those compounds wherein Y is benzyl.

The compounds produced by the process of this invention are useful as central nervous system depressants and, especially as oral hypnotics, as more fully disclosed in U.S. Patent No. 2,999,110.

In said Patent No. 2,999,110, a process of preparing those compounds of this invention, wherein Y is hydrogen or lower alkyl, is disclosed. This process entails the reaction of an isocyanate ester with an oxyamine. It has now been found that these compounds can be better prepared by the process of the present invention, wherein an acylcarbamic acid ester of the general formula $$R-\underset{\underset{R''}{|}}{\overset{\overset{R'}{|}}{C}}-CO-NH-\underset{\overset{\|}{O}}{C}OQ$$

wherein R, R', and R'' are as hereinbefore defined, and Q is lower alkyl or monocyclic ar(lower alkyl), is reacted with an oxyamine of the general formula

ZNHOY' wherein Z is as hereinbefore defined and Y' is lower alkyl or benzyl. The reaction is preferably conducted by heating the ester and oxyamine to an elevated temperature, optimally one in the range of about 100° C. to about 150° C.

Among the suitable oxyamines can be mentioned (lower alkoxy)amines, such as methoxyamine, ethoxyamine, propoxyamine, isopropoxyamine, n-butoxyamine, n-hexoxyamine and n-octyloxyamine; and benzyloxyamine.

If benzyloxyamine if employed as the reactant, the new intermediates of this invention of the general formula $$R-\underset{\underset{R''}{|}}{\overset{\overset{R'}{|}}{C}}-CO-\overset{H}{N}-\underset{\overset{\|}{O}}{C}-\overset{Z}{N}-OCH_2-\text{\textlangle}\text{\textrangle}$$

wherein R, R', R'', and Z are as hereinbefore defined, are formed. These benzyloxyamines can then be hydrogenolyzed, as by treatment with hydrogen in the presence of a hydrogenation catalyst, such as a noble metal catalyst as exemplified by palladium on carbon, to yield the corresponding hydroxyamino derivative (Y is hydrogen).

The acylcarbamic acid esters can be prepared by reacting an acyl chloride of the general formula $$R-\underset{\underset{R''}{|}}{\overset{\overset{R'}{|}}{C}}-CO-Cl$$

wherein R, R' and R'' are as hereinbefore defined, or the corresponding acid anhydride with a carbamic acid ester of the general formula $$NH_2-\underset{\overset{\|}{O}}{C}-OY'$$

wherein Y' is as hereinbefore defined. The reaction is preferably conducted at an elevated temperature, optimally one in the range of about 100° C. to about 150° C.

Among the suitable carbamic acid esters may be mentioned the lower alkyl (e.g., methyl, ethyl, and propyl) and monocyclic ar(lower alkyl) (e.g., benzyl) esters of carbamic acid.

Among the suitable acyl chlorides may be mentioned: (lower alkanoyl) chlorides, such as acetyl chloride, propionyl chloride, 2-ethyl-3-methylhexanoyl chloride, 2,2-diethyl butyryl chloride, pivaloyl chloride, 2,2-dimethylvaleryl chloride and enanthoyl chloride; monocyclic aryl (lower alkanoyl) chlorides, such as α-phenylbutyryl chloride, α-phenylhexanoyl chloride, phenylacetyl chloride, diphenylacetyl chloride, α,α-dimethylphenylacetyl chloride, α,α-diethylphenylacetyl chloride, hydrocinnamoyl chloride, α,α-diethylhydrocinnamoyl chloride, α-(p-chlorophenyl)butyryl chloride, α-(p-tolyl)butyryl chloride, α-(p-anisyl)butyryl chloride, α-(p-anisyl)-α-(ethyl)-butyryl chloride, 1-phenyl-1-cyclopentylcarbonyl chloride, and 1-phenyl-1-cyclohexylcarbonyl chloride; lower alkenoyl chlorides, such as 2,2-dimethyl-4-pentenoyl chloride, 4-hexenoyl chloride and 2-phenyl-3-butenoyl chloride; benzoyl chloride; isonicotinoyl chloride; nicotinoyl chloride and picolinoyl chloride.

Also utilizable are the corresponding acid anhydrides of the acyl chlorides enumerated above.

The following examples illustrate the invention (all temperatures being in centigrade):

EXAMPLE 1

*1-Benzyloxy-3-α,α-Dimethylvalerylurea*

(a) *Preparation of (2,2-dimethylvaleryl)carbamic acid ethyl ester.*—A mixture of 14.8 g. (0.1 M) of 2,2-dimethylvaleryl chloride and 17.8 g. (0.1 M) of ethyl carbamate is heated at 100–110° for 1 hour. The mixture is cooled and extracted with 250 cc. of hot hexane. The solid which crystallizes out is filtered and washed thoroughly with water to yield about 9 g. (45%) of product melting at about 109–110°. Recrystallization from hexane does not change the melting point.

(b) *Preparation of 1-benzyloxy-3-(2,2-dimethylvaleryl)urea.*—A mixture of 11 g. (0.054 M) of (2,2-dimethylvaleryl)carbamic acid, ethyl ester and 18 g. (0.14 M) benzyloxyamine is heated in an oil bath at 150° for 2 hours. The ethanol which forms is allowed to distil off. The excess benzyloxyamine is removed under reduced pressure and the residue triturated with cold hexane to yield about 7 g. (46%) of product melting at about 86–88°. Recrystallization from hexane raises the melting point to about 88–89°.

EXAMPLE 2

(a) *Preparation of 2,2-dimethylvaleric acid anhydride.*—A solution of 30 g. (0.25 M) of thionyl chloride in 25 cc. of ether is added at −5° to a solution of 65 g. (0.5 M) of 2,2-dimethylvaleric acid and 40 g. (0.5 M) of pyridine in 150 cc. of dry ether. A white crystalline precipitate forms immediately. The mixture is stirred at —5° for 1 hour; allowed to come to room temperature and stand overnight. The solid is filtered off and the ether removed from the filtrate. The residue is distilled to yield about 37 g. of product boiling at about 95–99°/3. It is redistilled through a 10 in. column and boils at about 94.5–95/2.5 mm.

(b) *Preparation of (2,2 - dimethylvaleryl)carbamic acid, ethyl ester.*—A mixture of 24.2 g. (0.1 M) of 2,2-dimethylvaleric acid anhydride, 8.9 g. (0.1 M) of ethyl carbamate and 0.5 cc. of conc. $H_2SO_4$ is heated at 110–120° for 6 hours. The dimethylvaleric acid formed is removed under reduced pressure and the residue crystallized on cooling to yield 14 g. (70%) of product melting at about 98–102°. After recrystallization from hexane the melting point is about 105–107°.

By the procedure of Example 1, step *b*, the (2,2-dimethylvaleryl)carbamic acid, ethyl ester, is converted to 1-benzyloxy-3-(2,2-dimethylvaleryl)urea.

EXAMPLE 3

1-(2,2-Dimethylvaleryl)-3-Hydroxyurea

A suspension of 44.3 g. (0.16 M) of 1-(benzyloxy)-3-(dimethylvaleryl)urea, 2 g. of 5% palladium on charcoal and 300 cc. of alcohol is shaken at room temperature and 50 p.s.i. hydrogen for 1 hour when the theoretical amount of hydrogen has been absorbed. The catalyst is filtered off and the alcohol removed under reduced pressure to yield a crystalline residue. This residue is recrystallized from 850 cc. of hot heptane to yield about 19 g. (63%) of product melting at about 107–108°.

EXAMPLE 4

1-(2,2-Diethylbutyryl)-3-Hydroxyurea (a) *Preparation of triethylacetic acid anhydride.*—A solution of 30 g. (0.5 M) of thionyl chloride in 25 cc. ether is added at —5° to a solution of 72 g. (0.5 M) of triethylacetic acid and 40 g. (0.5 M) of pyridine in 125 cc. dry ether. A white crystalline solid forms immediately. The mixture is stirred at —5° for 1 hour; then allowed to come to room temperature and stand overnight. The solid is filtered off and the ether removed from the filtrate. The residue is distilled to yield about 19 g. of product boiling at about 120–122°/2.

(b) *Preparation of 2,2-diethylbutyryl carbamic acid, ethyl ester.*—A mixture of 19 g. (0.07 M) of triethyl acetic acid anhydride, 6.2 g. (0.07 M) of ethyl carbamate and 1 cc. of conc. $H_2SO_4$ is heated at 110–120° for 3 hours. The triethyl acetic acid formed is distilled off under reduced pressure and the residue triturated with hexane to yield about 5 g. product melting at about 79–81°. After dissolving in dilute sodium hydroxide, reprecipitating with dilute HCl and then recrystallizing from hexane, the product melts at about 86–87°.

(c) *Preparation of 1-(benzyloxy)-3-(2,2-diethylbutyryl)urea.*—A mixture of 21.5 g. (0.1 M) of 2,2-diethylbutyryl carbamic acid, ethyl ester, and 18.5 g. (0.15 M) of benzyloxyamine is heated in an oil bath at 150° allowing the ethanol which forms to distil off. The excess benzyloxyamine is removed under reduced pressure and the residue triturated with cold hexane to yield the product. The product is recrystallized from hexane.

(d) *Preparation of 1-(2,2-diethylbutyryl)-3-hydroxyurea.*—A suspension of 29.2 g. (0.1 M) of 1-(benzyloxy)-3-(2,2-diethylbutyryl)urea and 1 g. of 5% palladium on charcoal is shaken at room temperature for 1 hour when the theoretical amount of hydrogen has been absorbed. The catalyst is filtered off and the alcohol removed under reduced pressure to yield a crystalline solid which after recrystallization from aqueous alcohol melts at about 121–122°.

EXAMPLE 5

1-(2-Ethyl-3-Methylhexanoyl)-3-Hydroxyurea

Following the procedure of Example 4 but substituting an equivalent amount of 2-ethyl-3-methylhexanoic acid for the triethylacetic acid in step *a*, 1-(2-ethyl-3-methylhexanoyl)-3-hydroxyurea is obtained, melting at about 117–119°.

EXAMPLE 6

1-Diphenylacetyl-3-Methoxyurea (a) *Preparation of diphenylacetyl carbamic acid, ethyl ester.*—Following the procedure of Example 1, step *a*, but substituting an equivalent amount of diphenylacetyl chloride for the 2,2-dimethylvaleryl chloride, there is obtained diphenylacetylcarbamic acid, ethyl ester.

(b) *Preparation of 1 - (diphenylacetyl)-3-methoxyurea.*—A mixture of 26.3 grams of diphenylacetylcarbamic acid, ethyl ester and 9.4 grams of methoxyamine in 10 cc. of ethyl alcohol are heated in a sealed tube at 120° for six hours. The contents of the tube are diluted with water and filtered. The solid is crystallized from aqueous ethanol to yield 1-methoxy-3-(diphenylacetyl)urea melting at about 186–188°.

EXAMPLE 7

3-Hydroxy-1-(2-Phenylbutyryl)Urea

Following the procedure of Example 4 but substituting an equivalent amount of 2-phenylbutyric acid for the triethylacetic acid in step *a*, 3-hydroxy-1-(2-phenylbutyryl)urea is obtained, melting at about 121.5–122.5°.

EXAMPLE 8

3-Methoxy-1-(2-Phenylhexanoyl)Urea

Following the procedure of Example 6 but substituting an equivalent amount of 2-phenylhexanoyl chloride for the diphenylacetyl chloride in step *a*, 3-methoxy-1-(2-phenylhexanoyl)urea is obtained.

EXAMPLE 9

3-Butoxy-1-(2-Phenylbutyryl)Urea

Following the procedure of Example 4 but substituting an equivalent amount of 2-phenylbutyryic acid for the triethylacetic acid in step *a* and an equivalent amount of butoxyamine for the benzyloxyamine in step *c*, 3-butoxy-1-(2-phenylbutyryl)urea is obtained, melting at about 93–94°.

EXAMPLE 10

3-Methoxy-1-Phenylacetylurea

Following the procedure of Example 6 but substituting an equivalent amount of phenylacetyl chloride for the diphenylacetyl chloride in step *a*, 3-methoxy-1-phenylacetylurea is obtained, melting at about 177–178°.

EXAMPLE 11

3-Methoxy-1-Pivaloylurea

Following the procedure of Example 6 but substituting an equivalent amount of pivaloyl chloride for the diphenylacetyl chloride in step *a*, 3-methoxy-1-pivaloylurea is obtained.

EXAMPLE 12

1-(α,α-Dimethylphenylacetyl)-3-Methoxyurea

Following the procedure of Example 6 but substituting an equivalent amount of α,α-dimethylphenylacetyl chloride for the diphenylacetyl chloride in step *a*, 1-(α,α-dimethylphenylacetyl)-3-methoxyurea is obtained.

EXAMPLE 13

3-Methoxy-1-(1-Phenylcyclohexylcarbonyl)Urea

Following the procedure of Example 6 but substituting an equivalent amount of 1-phenylcyclohexylcarbonyl chloride for the diphenylacetyl chloride in step *a*, 3-methoxy-1-(1-phenylcyclohexylcarbonyl)urea is obtained.

EXAMPLE 14

1-(2,2-Dimethylbutyryl)-3-Hydroxyurea

Following the procedure of Example 4 but substituting an equivalent amount of 2,2-dimethylbutyric acid for the triethylacetic acid in step a, there is obtained 1-(2,2-dimethylbutyryl)-3-benzyloxyurea, melting at about 69–71°. Upon hydrogenolysis as in Example 4, step d, there is obtained 1-(2,2-dimethylbutyryl)-3-hydroxyurea, melting at about 130–131°.

EXAMPLE 15

1-(Diphenylactyl)-3-Methoxy-3-Methylurea

Following the procedure of Example 6 but substituting an equivalent amount of N,O-dimethylhydroxylamine for the methoxyamine in step b, 1-(diphenylacetyl)-3-methoxy-3-methylurea is obtained.

EXAMPLE 16

1-Pivaloyl-3-Hydroxyurea

Following the procedure of Example 4 but substituting an equivalent amount of pivalic acid for the triethylacetic acid in step a, there is obtained 1-pivaloyl-3-benzyloxyurea, melting at about 134–135°. Upon hydrogenolysis as in Example 4, step d, there is obtained 1-pivaloyl-3-hydroxyurea, melting at about 162–164°.

EXAMPLE 17

1-(2-Ethyl-2-Phenylbutyryl)-3-Hydroxyurea

Following the procedure of Example 4 but substituting an equivalent amount of 2-ethyl-2-phenylbutyric acid for the triethylacetic acid in step a, 1-(2-ethyl-2-phenylbutyryl)-3-hydroxyurea, melting at 102–103°, is obtained.

EXAMPLE 18

1-Acetyl-3-Hydroxyurea

Following the procedure of Example 4 but substituting an equivalent amount of acetic anhydride for triethylacetic acid anhydride in step b, 1-acetyl-3-hydroxyurea is obtained.

EXAMPLE 19

1-Benzoyl-3-Hydroxyurea

Following the procedure of Example 4 but substituting an equivalent amount of benzoic acid for the triethylacetic acid in step a, 1-benzoyl-3-benzoyloxyurea, melting at about 173–175°, is obtained, which upon hydrogenolysis yields 1-benzoyl-3-hydroxyurea, melting at about 183–184°.

EXAMPLE 20

1-(2,2-Dimethylvaleryl)-3-Methoxyurea

Following the procedure of Example 6 but substituting an equivalent amount of 2,2-dimethylvaleryl chloride for the diphenylacetyl chloride in step a, there is obtained 1-(2,2-dimethylvaleryl)-3-methoxyurea, melting at about 78–79°.

EXAMPLE 21

1-Nicotinoyl-3-Hydroxyurea

Following the procedure of Example 4 but substituting an equivalent amount of nicotinic acid for the triethylacetic in step a, 1-nicotinoyl-3-hydroxyurea is obtained.

EXAMPLE 22

1-(α,α-Diethylhydrocinnamoyl)-3-Hydroxyurea

Following the procedure of Example 4 but substituting an equivalent amount of α,α-diethylhydrocinnamic acid for the triethylacetic acid in step a, 1-(α,α-diethylhydrocinnamoyl)-3-hydroxyurea is obtained.

EXAMPLE 23

1-[2-Ethyl-2-(p-Chlorophenyl)Butyryl]-3-Methoxyurea

Following the procedure of Example 6 but substituting an equivalent amount of 2-ethyl-2-(p-chlorophenyl) butyryl chloride for the diphenylacetyl chloride in step a, 1-[3-ethyl-2-(p-chlorophenyl)butyryl]-3-methoxyurea is obtained.

EXAMPLE 24

1-[2-Ethyl-2-(p-Methoxyphenyl)Butyryl]-3-Hydroxyurea

Following the procedure of Example 4 but substituting an equivalent amount of 2-ethyl-2-(p-methoxyphenyl) butyric acid for the triethylacetic acid in step a, 1-[2-ethyl-2-(p-methoxyphenyl)butyryl]-3-hydroxyurea is obtained.

EXAMPLE 25

1-(2,2-Dimethylhexanoyl)-3-Hydroxyurea

Following the procedure of Example 4 but substituting an equivalent amount of 2,2-dimethylhexanoic acid for the triethylacetic acid in step a, there is obtained 1-(2,2-dimethylhexanoyl)-3-benzyloxyurea, melting at about 89–90°. Upon hydrogenolysis as in Example 4 step d there is obtained 1-(2,2-dimethylhexanoyl)-3-hydroxyurea, melting at about 106–107°.

The invention may be variously otherwise embodied within the scope of the appended claims.

What is claimed is:

1. A compound of the formula $$\begin{array}{c} R' \quad\quad\quad H \quad\quad Z \\ | \quad\quad\quad\quad | \quad\quad\quad | \\ R-C-CO-N-C-N-O-CH_2-\!\!\bigcirc \\ | \quad\quad\quad\quad\quad\quad\quad \| \\ R'' \quad\quad\quad\quad\quad O \end{array}$$

wherein R is selected from the group consisting of hydrogen, lower alkyl, lower alkenyl, phenyl, halophenyl, (lower alkyl)phenyl, (lower alkoxy)phenyl and phenyl(lower alkyl); R' and R'' are each selected from the group consisting of hydrogen, lower alkyl, phenyl, halophenyl, (lower alkyl)phenyl and (lower alkoxy)phenyl; R' and R'' together with the carbon to which they are joined is lower cycloalkyl; R, R' and R'' together with the carbon to which they are joined is selected from the group consisting of phenyl and pyridyl; and Z is selected from the group consisting of hydrogen and lower alkyl.

2. 1-(benzyloxy)-3-(2,2-dimethylbutyryl)urea.
3. 1-(benzyloxy)-3-(2,2-dimethylvaleryl)urea.
4. 1-(benzyloxy)-3-(2,2-diethylbutyryl)urea.
5. A process for preparing a compound of the formula $$\begin{array}{c} R' \quad\quad\quad\quad Z \\ | \quad\quad\quad\quad \| \\ R-C-CO-NH-C-N-OH \\ | \quad\quad\quad\quad \| \\ R'' \quad\quad\quad\quad O \end{array}$$

wherein R, R', R'' and Z are as defined in claim 1, which comprises treating a corresponding compound of claim 1 with hydrogen in the presence of a hydrogenation catalyst.

References Cited in the file of this patent

UNITED STATES PATENTS

| | | |
|---|---|---|
| 2,226,835 | Rohm | Dec. 31, 1940 |
| 2,288,422 | Rohm | June 30, 1942 |

OTHER REFERENCES

Brewster et al.: Chem. Zent., vol. 2 (1937), pages 1538–9.

UNITED STATES PATENT OFFICE
CERTIFICATE OF CORRECTION

Patent No. 3,121,113            February 11, 1964

Jack Bernstein et al.

It is hereby certified that error appears in the above numbered patent requiring correction and that the said Letters Patent should read as corrected below.

Column 6, lines 54 to 57, the formula should appear as shown below instead of as in the patent:

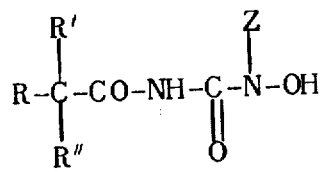

Signed and sealed this 23rd day of June 1964.

(SEAL)
Attest:

ERNEST W. SWIDER
Attesting Officer

EDWARD J. BRENNER
Commissioner of Patents